United States Patent

Creagh

[15] 3,655,270
[45] Apr. 11, 1972

[54] ELECTRO-OPTICAL DISPLAY DEVICES USING NEMATIC MIXTURES WITH VERY WIDE TEMPERATURE RANGES

[72] Inventor: Linda Truitt Creagh, Route 1, Argyle, Tex. 76226

[22] Filed: June 1, 1971

[21] Appl. No.: 148,759

Related U.S. Application Data

[63] Continuation-in-part of Ser. No. 67,722, Aug. 28, 1970, abandoned.

[52] U.S. Cl. ........................................... 350/160, 252/408
[51] Int. Cl. .................. G02f 1/28, G09k 3/00, G01m 31/00
[58] Field of Search ............... 350/160; 23/230 LC; 252/408

[56] References Cited

UNITED STATES PATENTS 3,441,513    4/1969    Woodmansee .................. 350/160 R Primary Examiner—Ronald L. Wibert
Assistant Examiner—V. P. McGraw
Attorney—James O. Dixon, Andrew M. Hassell, Harold Levine, Melvin Sharp, John E. Vandigriff, Michael A. Sileo, Jr., Gary C. Honeycutt and Richard L. Donaldson

[57] ABSTRACT

A display device wherein a layer of a novel nematic mesomorphic composition that is normally transparent to light scatters light in response to a voltage applied across the composition. The composition consists essentially of a ternary mixture of 4-ethoxybenzylidene-4'-n-butylaniline; 4-methoxybenzylidene-4'-aminophenyl butyrate, and bis-(4'-n-octyloxybenzal)-2-chloro-1,4-phenylenediamine and exhibits the nematic mesophase over a broad temperature range that includes room temperature.

11 Claims, 3 Drawing Figures

Patented April 11, 1972
3,655,270
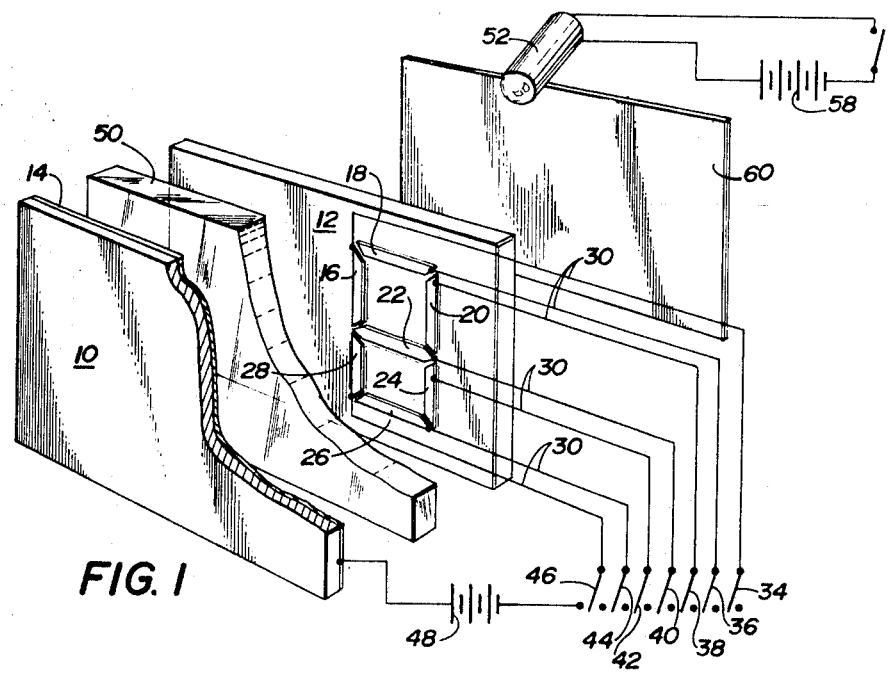
FIG. 1
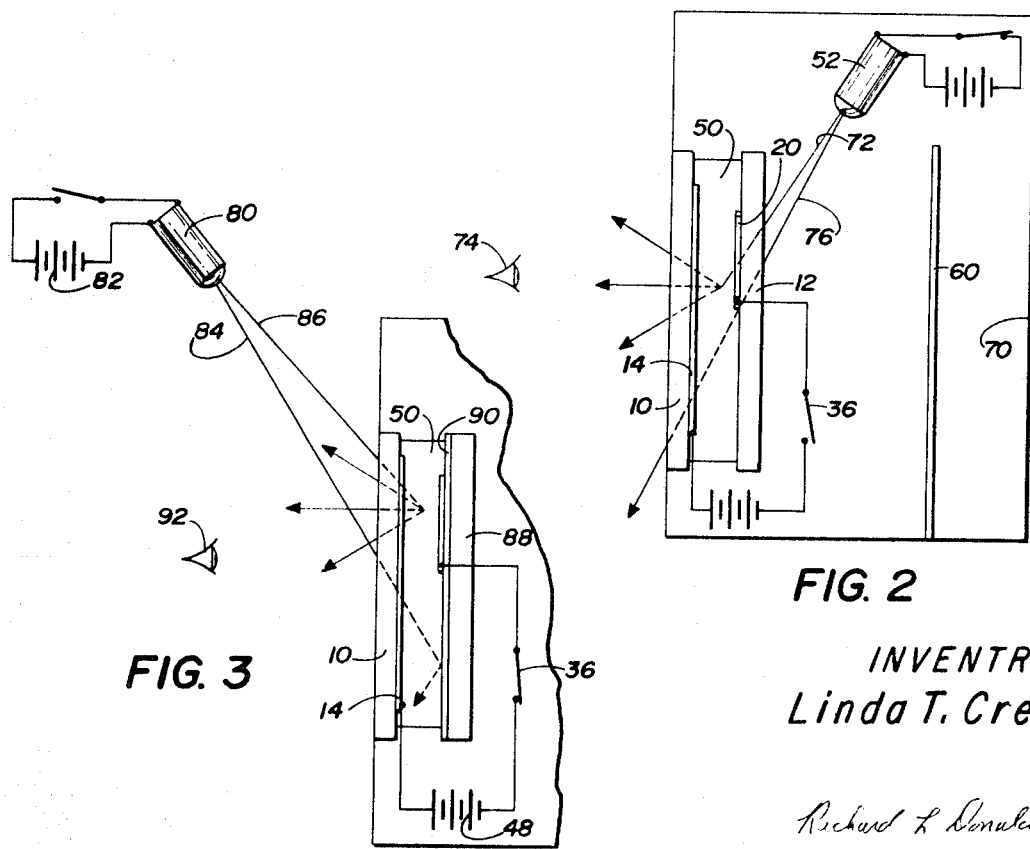
FIG. 3
FIG. 2
INVENTRESS
Linda T. Creagh
Richard L. Donaldson
ATTORNEY

ELECTRO-OPTICAL DISPLAY DEVICES USING NEMATIC MIXTURES WITH VERY WIDE TEMPERATURE RANGES

This is a continuation-in-part of copending application Ser. No. 067,722, filed Aug. 28, 1970, and now abandoned for ELECTRO-OPTICAL DISPLAY DEVICES USING NEMATIC MIXTURES WITH VERY WIDE TEMPERATURE RANGES. This invention relates to display devices and more particularly to electro-optical display devices utilizing a thin layer of a novel nematic mesomorphic composition.

The three common states of matter are the solid, liquid, and the gas in which the randomness of geometrical arrangement of the molecules increases from the solid to the liquid to the gas. The gas and the ordinary liquid are both isotropic, having the same physical properties in all directions. The solid may be amorphous, in which case the geometrical arrangement of the molecules is random, but the molecules are sufficiently bound so they are unable to move with respect to each other. Most inorganic and organic solids are found to be crystalline; that is, their molecular units are arranged in a regular repeating geometrical pattern known as a lattice unit. Many crystalline solids are anistropic in that their physical properties vary, depending upon the direction of measurement with respect to different crystal axes. For most pure substances, the transition temperature between the solid state and the liquid state is quite sharp.

Certain organic solid compounds however, exhibit a peculiar behavior such that when heated they melt at a specific temperature, producing an opaque melt that changes abruptly to a clear isotropic liquid at a higher threshold temperature. In the temperature range between the solid and the isotropic liquid these compounds are anistropic with respect to transmission of light. The characteristics of these compounds are thus, partly those of the crystalline solid, since they are anistropic, and partly those of the isotropic liquid since they exhibit liquid flow. These materials are therefore often called "liquid crystals" or more accurately, "crystalline liquids." These materials are sometimes classified as a fourth state of matter referred to as the mesomorphic state or mesophase. That is, a state or phase intermediate that of the anistropic crystal and that of the isotropic liquid.

There are essentially two major classes of liquid crystals, the "nematic" state and the "smectic" state. Materials having the nematic mesomorphic state frequently assume the characteristics of a thread-like texture when a thin section of the material is viewed between crossed polaroids. Nematic liquid crystals are normally transparent to light. When an electric potential, however, is impressed across the nematic liquid crystal it causes the crystal to scatter light. This effect has been termed "dynamic scattering" and is discussed in more detail in "Dynamic Scattering: A New Electro-Optic Effect in Certain Classes of Nematic Crystals," *Proceedings of the I.E.E.E.*, Vol. VI, No. 7, July 1968, by George H. Heilmeier et al.

The dynamic scattering effect of nematic liquid crystals in response to a voltage applied across the crystal is useful in many electro-optic devices such as alpha-numeric displays, light valves and etc. Such devices are disclosed in more detail in U.S. Pat. No. 3,322,485, issued to R. Williams May 30, 1967.

Conventional nematic liquid crystal materials exhibit the nematic mesophase only at relatively high temperatures, and thus require external environmental control apparatus to maintain the material in a nematic mesophase. Further, the temperature range of the mesophase is generally very narrow, requiring that the temperature be accurately maintained. Various techniques have been proposed for lowering the temperature range of the nematic mesophase such as, for example, the method described in patent application Ser. No. 16,078 entitled "Electro-Optical Devices Using Lyotropic Nematic Liquid Crystals," assigned to the assignee of the present invention. In this application, lyotropic nematic liquid crystals, which have a relatively low crystal-to-mesomorphic transition temperature, are used in lieu of conventional thermotropic nematic liquid crystals. Such methods for reducing the temperature at which the nematic mesophase exists, however, generally adversely affect the contrast ratio and switching characteristics of the display device.

Accordingly, it is an object of the present invention to provide a display device utilizing a nematic mesophase composition having a broad temperature range.

It is a further object of the present invention to provide an electro-optical display device that includes a nematic mesophase composition at room temperature and which has satisfactory switching characteristics and contrast ratios.

Briefly in accordance with the present invention, an electro-optical display device includes a first optically-transmissive substrate and a first optically-transmissive and electrically conductive coating on a face of the first substrate. A second substrate with an electrically conductive coating on a surface thereof is positioned such that the coating of the two substrates are adjacent and substantially equidistantly spaced apart. A light source means is positioned to direct light toward the substrates, and means are provided for impressing a voltage between the coatings. A ternary nematic liquid crystal composition is placed in the space between the coatings, the composition having a threshold electrical field which when exceeded will cause the composition to scatter light. The composition consists essentially of 4-ethoxybenzylidene-4'-n-butylaniline, 4-methoxybenzylidene-4 ' -aminophenyl butyrate, and bis-(4'-n-octyloxybenzal)-2-chloro-1,4-phenyl enediamine and has a broad temperature range in which it exhibits the nematic mesophase, the temperature range encompassing room temperature.

The novel features believed to be characteristic of this invention are set forth in the appended claims; the invention itself however, as well as other objects and advantages thereof may best be understood by reference to the following detailed description of illustrative embodiments when read in conjunction with the accompanying drawing in which:

FIG. 1 is an exploded schematic view of a display device utilizing the composition of the present invention;

FIG. 2 is a side view of a device similar to that shown in FIG. 1, and

FIG. 3 is a side view of another embodiment of the display device of the present invention.

Referring to FIG. 1, two substrates or plates 10 and 12 are positioned substantially parallel to each other. Substrate 10, shown partially broken away, is optically transmissive and has deposited on a face thereof a coating 14 of a material which is optically transmissive and electrically conductive. Substrate 12 is also optically transmissive and has coated thereon a plurality of electrically insulated electrodes 16, 18, 20, 22, 24, 26 and 28. These electrodes are also optically transmissive and electrically conductive. Each of the electrodes 16 through 28 has attached thereto a lead 30 which is optically transmissive and which has been electrically insulated by an optically transmissive insulating composition. The leads 30 are connected to switches 34, 36, 38, 40, 42, 44, and 46 which correspond respectively to specific ones of electrodes 16 – 28. Switches 34 – 46 are connected in parallel to a source 48 of electrical energy which is connected in series to electrically conductive coating 14.

Interposed between substrates 10 and 12 is a thin layer 50 of a ternary nematic liquid crystal composition. This composition consists essentially of 4-ethoxybenzylidene-4'-n-butylaniline, 4-methoxybenzylidene-4' -aminophenyl butyrate and bis-(4'-n-octyloxybenzal)-2-chloro-1,4-phenylenediamine.

For purpose of clarity, in the exploded view of FIG. 1 the thin layer 50 is shown separated from the substrates 10 and 12; however, in operation, the thin layer 50 is intimately in contact with the coating 14 and the electrodes, such as 16 – 28, formed on the surface of the substrate 12. A light source 52 is positioned behind substrate 12 to direct a light beam at an angle toward the rear face of substrate 12. Since both of the substrates 10 and 12 and the electrodes and coating thereon are optically transmissive, the light beam from source 52 normally passes through the display cell. The source of light 52 is electrically connected to a suitable electrical energy source 58 and may be any conventional source including an incandescent source. A nonreflective light absorbing plate 60, which is preferably a dull black in color, is positioned behind and spaced from the substrate 12.

Operation of the display device will be described with reference to FIG. 2 wherein there is a side view of the display device shown in FIG. 1. For clarity of description, only one electrode 20 of electrodes 16-28 is illustrated. The display device is shown enclosed by a suitable casing 70. As may be seen, the thin layer 50 of the ternary nematic mesomorphic composition contacts the electrically conductive coating 14 and electrode 20. When switch 36 is closed, a voltage is impressed across the layer 50 between electrode 20 and that portion of coating 14 corresponding thereto. This voltage causes the portion of layer 50 to which the voltage is impressed to diffuse light coming from light source 52. For purposes of illustration, light beam 72 is shown being diffused toward the eye 74 of an observer. A second representative light beam 76 passes through the portion of the ternary nematic mesomorphic composition across which no voltage is impressed without being diffused. Thus, the observer is unable to see light from the light source in that portion of the layer. Plate 60 is provided to eliminate internal reflections from the light source 52 and also to eliminate stray room light which may interfere with the display characteristics of the display screen.

With reference again to FIG. 1, it may be seen that if switches 34 and 46 are energized, a voltage will be impressed across layer 50 in that portion of the layer corresponding to electrodes 16 and 28. An observer, such as observer 74 of FIG. 2, will see a numeral "1" displayed. Similarly, if all of the switches 34 – 46 are closed, the observer will see a numeral "8" displayed.

In FIG. 3 a different embodiment of the present invention is illustrated. In this embodiment, the optically transmissive substrate 10 and optically transmissive and electrically conductive coating 14 are constructed the same as above. A light source 80 connected to a suitable energy source 82 is positioned exterior to casing 70 to direct light beams 84 and 86 toward the ternary nematic mesomorphic layer 50. In this embodiment, substrate 88 need not be optically transmissive. Contacting substrate 88 is a reflective coating 90 onto which an electrode, such as 20, is formed. Similar to the foregoing embodiment, the electrode 20 is electrically connected to switch 36 which is operable to impress an energy source 48 across electrode 20 and coating 14. In this embodiment, light from source 80, for example, light beam 86, strikes the ternary nematic mesomorphic layer 50 in an area across which a voltage is impressed. The light is diffused by layer 50 and is reflected back toward the observer 92 by the reflective coating 90. Light beam 84, on the other hand, does not traverse a portion of the layer 50 across which an electrical field has been impressed and is therefore reflected by coating 90 away from the observer 92. Thus, as above, the observer 92 will see a display corresponding only to the size and shape of the electrode 20. Light source 80, in this embodiment, need not be an artificial source, as shown, but may be any available source including sunlight.

The electrical energy or impressed voltage across the layer 50 must be sufficiently large to reach or exceed a threshold voltage at which the ternary nematic mesomorphic composition will scatter light. Either ac voltages, such as illustrated in the aforementioned Williams patent, or dc voltages may be used to effect dynamic scattering. If dc voltages are used, improved display characteristics may be obtained by controlling the amount of conductivity affecting impurities in the mesomorphic composition so that they total from one-half to two percent by weight of the composition. This may advantageously be achieved by initialing purifying the material to a purity level of, e.g., from 98.0 to 99.5 percent, the remaining impurities from the starting material from which the composition was synthesized being effective to sufficiently increase the conductivity of the composition to enhance dc operation. It has been found that for layers having a thickness of about 1 millimeter, the threshold voltage for most compositions having from one-half to two percent by weight of conductivity affecting impurities therein occurs at around 7 volts dc while preferably a voltage on the order of 20 volts dc is utilized. For best results it has been found that the layers should be relatively thin, preferably less than 20 millimeters. The substrates 10 and 12 may be composed of any suitable material which is optically transmissive, for example, various types of glass, fused quartz, transparent varieties of corundum and transparent plastics or resins. The term optically transmissive as used herein includes both transparent and translucent materials. The coating and electrodes which are both electrically conductive and optically transmissive such as coating 14 and electrodes 16 – 28 may be composed of layers of indium oxide or tin oxide deposited on the surface of the respective substrates. If a reflective surface is desired, a thin layer of a metallic material such as silver or aluminum may be deposited on the substrate, such as coating 90 on substrate 88. It is to be understood, of course, with reference to FIG. 3, that the reflective coating 90 may be placed either at the front or rear of the substrate 88, but if placed on the front of substrate 88 as shown in FIG. 3, it must be electrically insulated from the electrode 20 to give the desired display effect. An alternate means of producing the desired reflection is to eliminate the coating 90 and compose the electrode 20 of a suitable reflective and conductive material.

Ternary nematic mesomorphic compositions which may be utilized with the present invention include compositions consisting essentially of 4-ethoxy-benzylidene-4'-n-butylaniline, 4-methoxybenzylidene-4'-aminophenyl butyrate and bis-(4'-n-octyloxybenzal)-2-chloro-1,4-phenylenediamine. These compositions are nematogenic, that is, in the nematic mesophase, through a broad range of temperatures, including room temperature. Specific ternary compositions were prepared by placing the appropriate weights of each of the materials in a sealed vial. The vial was warmed until the materials were isotropic, and was then placed in an ultrasonic bath at that temperature for about 2 to 3 hours. The vial was then allowed to cool slowly to room temperature in the ultrasonic bath. Exemplary compositions include the following, wherein the materials were purified, by conventional techniques, such as recrystallization and distillation, to a level such that the total amount of impurities comprised from ½ to 2 percent by weight of mixture; dc voltages were utilized to effect dynamic scattering.

EXAMPLE 1

A composition was prepared having 65 percent by weight of 4-ethoxybenzylidene-4¹-n-butylaniline, 15 percent by weight of 4-methoxybenzylidene-4'-aminophenyl butyrate and 20 percent by weight of bis-(4'-n-oxtyloxybenzal)-2-chloro-1,4-phenylenediamine. The composition prepared as above described exhibited a crystal to mesomorphic transition temperature of −6° C. and a mesomorphic to isotropic liquid transition temperature of 105° C. The composition was placed in an electro-optical display cell as above described and the response characteristics were tested at 25° C. With 40 volts applied across the display cell the composition exhibited a rise time of 20 milliseconds and a decay time of 20 milliseconds. With 60 volts applied across the cell, the composition exhibited a rise time of 5 milliseconds and a decay time of 5 milliseconds. The threshold voltage for producing dynamic scattering was 6.5 volts. The maximum contrast ratio of the composition was 20:1.

EXAMPLE 2

A composition was prepared having 50 percent by weight of 4-ethoxybenzylidene-4¹-n-butylaniline, 35 percent by weight of 4-methoxybenzylidene-4'-aminophenyl butyrate and 15 percent by weight of bis-(4'-n-octyloxybenzal)-2-chloro-1,4-phenylenediamine. The composition exhibited a mesomorphic temperature range of −9° to 105° C.

EXAMPLE 3

A composition was prepared including 50 percent by weight of 4-ethoxybenzylidene-4'-n-butylaniline, 30 percent by weight of 4-methoxybenzylidene-4'-aminophenyl butyrate and 20 percent by weight of bis-(4'-n-octyloxybenzal)-2-chloro-1,4-phenylenediamine. The composition exhibited a nematic mesophase temperature range of −8° to 110° C. The composition was tested in a display cell at 25° C. With 20 volts applied across the composition it exhibited a rise time of 20 milliseconds and a decay time of 70 milliseconds. With 40 volts applied across the cell, the rise time was 5 milliseconds and the decay time was 60 milliseconds while with 60 volts applied across the cell, the rise time was 5 milliseconds and the decay time was 75 milliseconds.

EXAMPLE 4

A composition was prepared including, by weight, 50 percent 4-ethoxybenzylidene-4'-n-butylaniline, 25 percent 4-methoxybenzylidene-4'-aminophenyl butyrate and 25 percent bis-(4'-n-octyloxybenzal) -2-chloro-1,4-phenylenediamine. The composition exhibited the nematic mesophase within a temperature range of 8° to 112° C.

EXAMPLE 5

A composition was prepared to include by weight 45 percent of 4-ethoxybenzylidene-4'-n-butylaniline, 35 percent of 4-methoxybenzylidene-4'-aminophenyl butyrate and 20 percent of bis-(4'-n-octyloxybenzal)-2-chloro-1,4-phenylenediamine. The composition had a nematic mesophase temperature range of −10° to 110° C.

EXAMPLE 6

A composition was prepared to include, by weight, 45 percent of 4-ethoxybenzylidene-4'-n-butylaniline, 30 percent of 4-methoxybenzylidene-4'-aminophenyl butyrate and 25 percent of bis-(4'-n-octyloxybenzal)-2-chloro-1,4-phenylenediamine. The composition exhibited the nematic mesophase within a temperature range of 10° to 112° C.

EXAMPLE 7

A composition was prepared to include, by weight, 40 percent of 4-ethoxybenzylidene-4'-n-butylaniline, 40 per cent of 4-methoxybenzylidene-4'-aminophenyl butyrate and 20 percent of bis-(4'-n-octyloxybenzal)-2-chloro-1,4-phenylenediamine. The composition exhibited a mesomorphic temperature range of −12° to 110° C.

EXAMPLE 8

A composition was prepared to include, by weight, 40 percent of 4-ethoxybenzylidene-4'-n-butylaniline, 35 percent of 4-methoxybenzylidene-4'-aminophenyl butyrate and 25 percent of bis-(4'-n-octyloxybenzal)-2-chloro-1,4-phenylenediamine. The composition exhibited the nematic mesophase in the temperature range of −15° to 115° C. The material was tested in a display cell at 25° C. With 26 volts applied across the cell, the composition exhibited a rise time of 10 milliseconds and a decay time of 10 milliseconds. With 40 volts applied across the cell, the rise time was 7 milliseconds and the decay time was 10 milliseconds. With 60 volts applied across the cell, the rise time was 5 milliseconds and the decay time was 5 milliseconds. The threshold voltage required to produce dynamic scattering was 7 volts. The maximum contrast ratio measured was 30:1.

EXAMPLE 9

A composition was prepared to include, by weight, 40 percent of 4-ethoxybenzylidene-4'-n-butylaniline, 30 percent of 4-methoxybenzylidene-4'-aminophenyl butyrate and 30 percent of bis-(4'-n-octyloxybenzal)-2-chloro-1,4-phenylenediamine. The composition exhibited the nematic mesophase within a temperature range of 13° to 120° C. The composition was tested in a display cell at 25° C. With 20 volts applied across the cell, the composition exhibited a rise time of 35 milliseconds and a decay time of 85 milliseconds. With 30 volts applied across the cell, the rise time was 30 milliseconds and the decay time was 70 milliseconds. With 40 volts potential applied across the cell, the rise time was 10 milliseconds and the decay time was 70 milliseconds. With 60 volts applied across the cell, the rise time measured 6 milliseconds and the decay time 75 milliseconds. With 80 volts applied across the cell, the rise time was 6 milliseconds and the decay time was 80 milliseconds.

EXAMPLE 10

A composition was prepared to include, by weight, 35 percent of 4-ethoxybenzylidene-4'-n-butylaniline, 40 percent of 4-methoxybenzylidene-4'-aminophenyl butyrate and 25 percent of bis-(4'-n-octyloxybenzal)-2-chloro-1,4-phenylenediamine. The composition has a mesomorphic temperature range of 0° to 113° C. The composition was tested in a 1 mil display cell at 25° C. With 20 volts applied potential, the rise time was 30 milliseconds and the decay time was 90 milliseconds. With 40 volts applied potential, the rise time was 7 milliseconds and the decay time was 80 milliseconds. With 60 volts potential, the rise time was 4 milliseconds and the decay time was 70 milliseconds. With 80 volts potential, the rise time was 3 milliseconds and the decay time was 80 milliseconds. The threshold voltage to achieve dynamic scattering was 6.5 volts and the maximum contrast ratio measured was 40:1.

EXAMPLE 11

A composition was prepared to include, by weight, 31 percent of 4-ethoxybenzylidene-4'n-butylaniline, 31 percent of 4-methoxybenzylidene-4'-aminophenyl butyrate and 38 percent of bis-(4'-n-octyloxybenzal)-2-chloro-1,4-phenylenediamine. The composition had a temperature range of 14° to 118° C. The material was tested in a 1 mil display cell at 25° C. With 20 volts applied across the cell, the rise time was 30 milliseconds and the decay time was 100 milliseconds. With 40 volts applied potential, the rise time was 20 milliseconds and the decay time was 70 milliseconds. With 60 volts potential applied across the cell, the rise time was 18 milliseconds and the decay time was 70 milliseconds.

A summary of the compositions produced and the temperature ranges in which the nematic mesophase was exhibited is depicted in TABLE I.

TABLE I

| Example no. | Material, weight % *A | *B | *C | Crystal to mesomorphic temperature | Mesomorphic to isotropic temperature |
| --- | --- | --- | --- | --- | --- |
| 1 | 65% | 15% | 20% | −6° C. | 105° C. |
| 2 | 50% | 35% | 15% | −9° C | 105° C |
| 3 | 50% | 30 % | 20% | −8° C | 110° C |
| 4 | 50% | 25% | 25% | 8° C | 112° C |
| 5 | 45% | 35% | 20% | −10° C | 110° C |
| 6 | 45% | 30% | 25% | 10° C | 112° C |
| 7 | 40% | 40% | 20% | −12° C | 110° C |
| 8 | 40% | 35% | 25% | −15° C | 115° C |
| 9 | 40% | 30% | 30% | 13° C | 120° C |
| 10 | 35% | 40% | 25% | 0° C | 113° C |
| 11 | 31% | 31% | 38% | 14° C | 118° C |

*Material A represents 4-ethoxybenzylidene-4'-n-butylaniline

Material B represents 4-methoxybenzylidene-4'-aminophenyl butyrate

Material C represents bis-(4'-n-octyloxybenzal)-2-chloro-1,4-phenylenediamine

The response characteristics of the compositions tested in a 1 mil electro-optical display cell at 25° C. are summarized in TABLE II.

TABLE II

Response Characteristics, 1 mil Cell, 25° C.

| Example No. | Material *A *B *C | Applied Voltage V | Rise Time msec. | Decay msec. | Threshold Voltage volts | Contrast ratio Max. |
|---|---|---|---|---|---|---|
| 8 | 40 35 25 | 60 | 5 | 5 | 7 | 30:1 |
|   |          | 40 | 7 | 10 |   |   |
|   |          | 26 | 10 | 10 |   |   |
|   | 65 15 20 | 60 | 5 | 5 | 6.5 | 20:1 |
|   |          | 40 | 20 | 20 |   |   |
| 3 | 50 30 20 | 60 | 5 | 75 |   |   |
|   |          | 40 | 5 | 60 |   |   |
|   |          | 20 | 20 | 70 |   |   |
| 11 | 31 31 38 | 60 | 18 | 70 |   |   |
|   |          | 40 | 20 | 70 |   |   |
|   |          | 20 | 30 | 100 |   |   |
| 10 | 35 40 25 | 80 | 3 | 80 | 6.5 | 40:1 |
|   |          | 60 | 4 | 70 |   |   |
|   |          | 40 | 7 | 80 |   |   |
|   |          | 20 | 30 | 90 |   |   |
| 9 | 40 30 30 | 80 | 6 | 80 |   |   |
|   |          | 60 | 6 | 75 |   |   |
|   |          | 40 | 10 | 70 |   |   |
|   |          | 30 | 30 | 70 |   |   |
|   |          | 20 | 35 | 85 |   |   |

*Material A is 4-ethoxybenzylidene-4'-n-butylaniline

Material B is 4-methoxybenzylidene-4'-aminophenyl butyrate

Material C is bis-(4'-n-octyloxybenzal)-2-chloro-1,4-phenylene-diamine

Although examples have been given showing specific ratios of the three materials forming the composition, it is to be understood that other ratios of the three materials may be used within the scope of the present invention. In other words, a novel feature of the invention is producing a ternary mixture of the three materials, regardless of the precise ratio of each, to produce a composition having a nematic mesophase with a large temperature range. It is to be appreciated that by varying the relative ratios of the specific materials, the upper and lower limits of the temperature range at which the composition is in the mesomorphic state may be varied while maintaining a broad overall mesomorphic temperature range.

What is claimed is:

1. In an electro-optical display device including a first optically transmissive substrate having an optically transmissive and electrically conducting coating on a face thereof, a second substrate having an electrically conductive coating on a face thereof, said substrate being positioned such that the coatings are adjacent and substantially equidistantly spaced, a light source means positioned to direct light toward the substrates, and means for impressing a voltage gradient between selected portions of said coatings, the improvement comprising a ternary nematic liquid crystal composition consisting essentially of 4-ethoxybenzylidene-4'-n-butylaniline, 4-methoxybenzylidene-4'-aminophenyl butyrate and bis-(4'-n-octyloxybenzal)-2-chloro-1,4-phenylenediamine occupying the space between said coatings, said composition having a threshold electrical field which when exceeded causes the composition to scatter light.

2. The device of claim 1 wherein said composition consists essentially of from about 30 to 65 percent weight percentage of 4-ethoxybenzylidene-4'-n-butylaniline, from about 15 to 40 weight percentage of 4-methoxybenzylidene-4'-aminophenyl butyrate, and from about 15 to 40 weight percentage of bis-(4'-n-octyloxybenzal)-2-chloro-1,4-phenylenediamine.

3. The device of claim 1 wherein said composition consists essentially of from about 30 to 65 percent weight percentage of 4-ethoxybenzylidene-4'-n-butylaniline, from about 15 to 40 weight percentage of 4-methoxybenzylidene-4'-aminophenyl butyrate, from about 15 to 40 weight percentage of bis-(4'-n-octyloxybenzal)-2-chloro-phenylenediamine, and from about ½ to 2 weight percentage of conductivity affecting impurities, and wherein said composition is nematogenic at room temperature.

4. The device of claim 3 wherein said composition is nematogenic at temperatures in the range of from about −15° to 120° C.

5. The device of claim 1 wherein said second substrate is optically transmissive.

6. The device of claim 1 wherein said second substrate is capable of reflecting light.

7. The device of claim 6 wherein the second substrate has an optically reflective layer thereon.

8. A method for displaying light from a light source comprising the steps of:
   a. directing a light beam at an angle toward a thin layer of a ternary nematic liquid crystal composition consisting essentially of 4-ethoxybenzylidene-4'-n-butylaniline, 4-methoxybenzylidene-4'-aminophenyl butyrate and bis-(4'-n-octyloxybenzal)-2-chloro-1,4-phenylenediamine, and
   b. impressing a voltage across said layer sufficient to cause said composition to scatter light.

9. The method of claim 8 wherein the ternary mixture consists essentially of from about 30 to 65 weight percentage of 4-ethoxybenzylidene-4'-n-butylaniline, from about 15 to 40 weight percentage of 4-methoxybenzylidene-4'-aminophenyl butyrate, and 15 to 40 weight percentage of bis-(4'-n-octyloxybenzal)-2-chloro-1,4-phenylenediamine, and from about ½ to 2 weight percentage of conductivity affecting impurities, and wherein the composition is nematogenic in the temperature range of from about −15° to 120° C.

10. A ternary nematic liquid composition consisting essentially of from about 30 to 65 percent weight of 4-ethoxybenzylidene-4'-n-butylaniline, from about 15 to 40 percentage weight of 4-methoxybenzylidene-4'-aminophenyl butyrate and from about 15 to 40 percent weight of bis-(4'-n-octyloxybenzal)-2-chloro-1,4-phenylenediamine.

11. A ternary nematic liquid composition consisting essentially of from about 30 to 65 percent weight of 4-ethoxybenzylidene-4'-n-butylaniline, from about 15 to 40 percentage weight of 4-methoxybenzylidene-4'-aminophenyl butyrate, from about 15 to 40 percent weight of bis-(4'-n-octyloxybenzal)-2-chloro-1,4-phenylenediamine, and from ½ to 2 percent weight of conductivity affecting impurities.

* * * * *